United States Patent [19]
Cunningham

[11] Patent Number: 5,244,246
[45] Date of Patent: Sep. 14, 1993

[54] PROTECTIVE COVERING MEANS FOR AUTOMOBILE ROOF AND WINDOWS

[76] Inventor: Sidney A. Cunningham, 1368 New York Ave., Brooklyn, N.Y. 11203

[21] Appl. No.: 930,283

[22] Filed: Aug. 17, 1992

[51] Int. Cl.⁵ .............................................. B60J 11/00
[52] U.S. Cl. .................................................. 296/136
[58] Field of Search ........................ 296/136; 150/166; 135/88

[56] References Cited

U.S. PATENT DOCUMENTS

| | | | |
|---|---|---|---|
| 2,787,311 | 4/1957 | Cohen et al. | 296/136 X |
| 4,209,197 | 6/1980 | Fisher | 296/136 |
| 4,821,785 | 4/1989 | Rolan | 150/166 |
| 5,112,098 | 5/1992 | Lichtmann | 296/136 |

Primary Examiner—Robert R. Song
Attorney, Agent, or Firm—Goodman & Teitelbaum

[57] ABSTRACT

Protective covering device for automobile roof and windows which includes a roof covering portion for removable positioning on the automobile roof, a front shade portion for removable positioning on the automobile front window, a rear shade portion for removable positioning on the automobile rear window, side shade portions for removable positioning on the opposite side windows of the automobile, and snap fasteners for removably securing the shade portions to the roof covering portion. The roof covering portion and the shade portions are preferably fabricated from a heavy duty plastic, which is transparent or opaque. Straps secure the roof covering portion to the automobile roof. Longitudinally extending recesses or grooves are formed along opposite sides of the roof covering portion adjacent to the edge portions thereof to provide gutters for preventing water from entering the automobile side windows. Additional snap fasteners are provided to secure the shade portions in a folded back position onto the roof covering portion. The side shade portions include a front and rear side shade portion for each side of the automobile, with each being separately secured to the roof covering portion, so that the automobile doors can be opened and closed.

18 Claims, 1 Drawing Sheet

PROTECTIVE COVERING MEANS FOR AUTOMOBILE ROOF AND WINDOWS

BACKGROUND OF THE INVENTION

The invention relates to protective covers, and more particularly, to protective covering means for automobile roof and windows having parts, which are removably secured together, including a roof covering portion for removable positioning on the automobile roof, a front shade portion for removable positioning on the automobile front window, a rear shade portion for removable positioning on the automobile rear window, side shade portions for removable positioning of opposite side windows of the automobile, and fastener means for removably securing the shade portions to the roof covering portion.

Automobile covers are well known in the prior art, however, these prior art automobile covers are usually made in a unitary one piece construction which is bulky, and usually covers the entire automobile. Furthermore, these prior art automobile covers are usually opaque so that the car cannot be driven when covered with same, where it is the intention that these prior art automobile covers be used when the automobile is parked or in storage.

Accordingly, there is presently a need for an automobile protective cover that can easily be positioned on and removed from the automobile, that permits convenient storage thereof when not in use, that permits the automobile to be driven when in use, and that permits shade portions thereof to be folded back onto the roof covering portion for securement thereto to provide an unobstructed view through the automobile windows.

SUMMARY OF THE INVENTION

It is accordingly an object of the present invention to provide protective covering means for an automobile, which avoids the problems of the prior art devices.

Another object of the present invention is to provide protective covering means for an automobile, which covers the roof and windows thereof to protect same from sleet, ice and snow during the winter, and from the sun and heat during the summer.

A further object of the present invention is to provide protective covering means for an automobile, which includes parts thereof which can be removably secured together.

Yet another object of the present invention is to provide protective covering means for an automobile, which is fabricated from heavy duty plastic, being either transparent or opaque.

Still another object of the present invention is to provide protective covering means for an automobile, which includes a roof covering portion for removable positioning on the automobile roof, and shade portions for removable positioning on the front, rear and side windows of the automobile.

Another object of the present invention is to provide protective covering means for an automobile as described above, which includes snap fastener means for securing the shade portions to the roof covering portion.

Yet another object of the present invention is to provide protective covering means for an automobile as described above, which includes means for securing same to the automobile.

Another object of the present invention is to provide protective covering means for an automobile as described above, which includes means for securing the shade portions in a folded back position onto the roof covering portion.

Still another object of the present invention is to provide protective covering means for an automobile, which can be easily mounted on and removed from the automobile, and which can be conveniently stored when not in use.

And yet another object of the present invention is to provide protective covering means for a automobile, which is inexpensive to manufacture, can readily be assembled, and is reasonably priced.

Briefly, in accordance with the present invention, there is provided protective covering means for automobile roof and windows which includes a roof covering portion for removable positioning on the automobile roof, a front shade portion for removable positioning on the automobile front window, a rear shade portion for removable positioning on the automobile rear window, side shade portions for removable positioning on the opposite side windows of the automobile, and fastener means, such as snap fasteners, for removably securing the shade portions to the roof covering portion. The roof covering portion and the shade portions are preferably fabricated from a heavy duty plastic, which is transparent or opaque.

Securement means, such as straps, secure the roof covering portion to the automobile roof. Longitidually extending recesses or grooves are formed along opposite sides of the roof covering portion adjacent to the edge portions thereof to provide gutters for preventing water from entering the automobile side windows. Additional fastening means, such as snap fasteners, are provided to secure the shade portions in a folded back position onto the roof covering portion. The side shade portions include a front and rear side shade portion for each side of the automobile, with each being separately secured to the roof covering portion, so that the automobile doors can be opened and closed.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

In the various figures of the drawings, like reference characters designate like parts.

DESCRIPTION OF THE PREFERRED EMBODIMENTS

Figure 1:
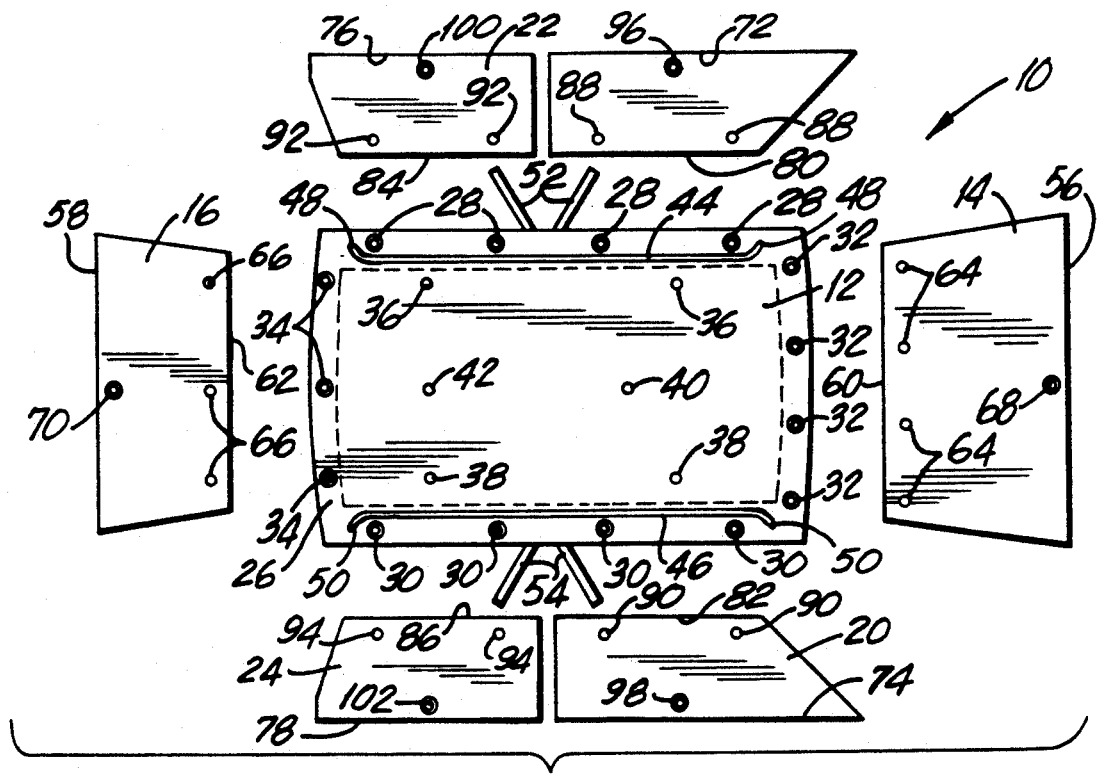
FIG. 1 is an exploded plan view showing the parts of a protective covering means for an automobile roof and the windows thereof in accordance with the present invention.

Referring now to the drawings, FIG. 1 shows the attachable and removable parts of a protective covering device 10 for an automobile roof and windows. The protective covering device 10 includes a roof covering portion 12, a front shade portion 14, a rear shade portion 16, front side shade portions 18, 20 and rear side shade portions 22, 24. Preferably, the roof covering and shade portions are fabricated from a heavy duty plastic material, which can be transparent or opaque as set forth below. Though the roof covering and shade portions are shown with a particular construction, it is understood that these parts can be modified and produced in various sizes and shapes in order to fit different makes and models of automobiles, where such modification would be obvious to one skilled in the art without departing from the concept of the present invention.

The roof covering portion 12 has a substantially rectangular shape, where the front, rear and side edge portions thereof are folded back onto themselves to provide a hem border 26 around the perimeter of the roof covering portion 12 to reinforce the edges thereof. A preselected number of fastening means, such as four female portions 28 of snap fasteners on one side thereof, four female portions 30 of snap fasteners on the opposite side thereof, four female portions 32 on the front edge portion thereof, and three female portions 34 of snap fasteners on the rear edge portion thereof, are positioned and secured through the hem border 26. Additional fastening means, such as a pair of male portions 36 of snap fasteners on one side thereof, a pair of male portions 38 of snap fasteners on the opposite side thereof, a centrally positioned male portion 40 adjacent the front thereof, and a centrally positioned male portion 42 adjacent the rear thereof, are mounted and secured through the body of the roof covering portion 12 in a predetermined spaced position from the hem border 26, the function of which will be explained below.

Additionally, longitudinally extending recesses or grooves 44, 46 are formed in the hem portion 26 along opposite sides of the roof covering portion 12 in a conventional manner well known in the art to provide gutters for preventing water from entering the side windows of the automobile in a well known manner. Preferably, the opposite ends 48, 50 of each of the recesses 44, 46, respectively, are curved outwardly towards the respective side edges of the hem border 26 to provide run-offs for the water collected in the recesses 44, 46.

Furthermore, a pair of straps 52, 54, or the like, are each secured to central edge portions of the hem border 26 on opposite sides of the roof covering portion 12 in a conventional manner well known in the art. Preferably, the straps 52, 54 are also fabricated from a heavy duty plastic material. The function of the straps 52, 54 will be explained below.

The front and rear shade portions 14, 16 each have a substantially trapezoid shape where the lower edges 56, 58 are longer than the upper edges 60, 62, respectively, to correspond to the particular shape of the front and rear windows of an automobile. A preselected number of fastening means, such as four male portions 64 of snap fasteners on the front shade portion 14 and three male portions 66 of snap fasteners on the rear shade portion 16, are positioned and secured adjacent to the upper edges 60, 62, respectively, for fastening to the associated four female snap portions 32 and three female snap portions 34 on the roof covering portion 12, respectively. Furthermore, additional fastening means, such as male portions 68, 70 of snap fasteners, are mounted and secured through a central portion of each of the front and rear shade portions 14, 16 adjacent to the lower edge 56, 58 thereof, respectively, for securement to the male snap portions 40, 42, respectively, of the roof covering portion 12, as will be explained below.

Figure 2:
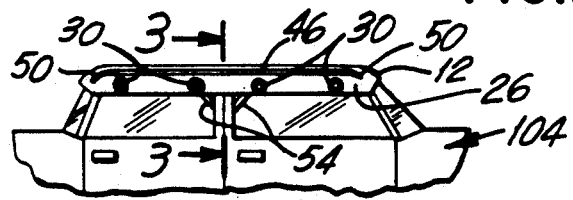
FIG. 2 is a fragmented side view showing the roof covering portion of FIG. 1 secured on the roof of an automobile.
Figure 3:
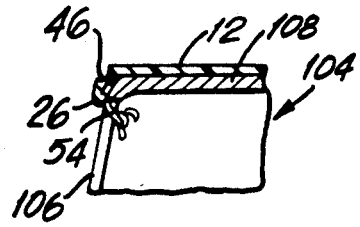
FIG. 3 is a fragmented sectional view taken along line 3—3 of FIG. 2.

The front and rear side shade portions 18, 20, 22, 24 each also have a substantially trapezoid shape where the lower edges 72, 74, 76, 78 are longer than the upper edges 80, 82, 84, 86, respectively, to correspond to the appropriate shape of the side windows of an automobile. A preselected number of fastening means, such as two male portions 88 of snap fasteners on the front side shade portion 18, two male portions 90 of snap fasteners on the front side shade portion 20, two male portions 92 of snap fasteners on the rear side shade portion 22 and two male portions 94 of snap fasteners on the rear side shade portion 24, are positioned and secured adjacent to the upper edges 80, 82, 84, 86, respectively, for fastening to the associated female snap portions 28, 30 on the roof covering portion 12. Furthermore, additional fastening means, such as male portions 96, 98, 100, 102 of snap fasteners, are mounted and secured through a central portion of each of the front and rear side shade portions 18, 20, 22, 24 adjacent to the lower edges 72, 74, 76, 78 thereof, respectively, for securement to associated ones of the male portions 36, 38 on the roof covering portion 12, as will be explained below FIG. 2 shows the roof covering portion 12 disposed on the roof of a conventional automobile 104 in a covering position so that the recesses 44, 46 and the female snap portions 28, 30 overhang on opposite downwardly directed sides of the automobile roof. Accordingly, the female snap portions 32, 34 also overhang the front and rear downwardly directed portions of the automobile roof, respectively. With the automobile doors open, each pair of straps 52, 54 is inserted behind the center door post 106 of the automobile 104 and then the straps 52, 54 of each pair are tied together, as best shown in FIG. 3, to secure the roof covering portion 12 to the roof 108 of the automobile.

Obviously, there are many ways in which the roof covering portion 12 could be secured to the roof 108 of the automobile 104, such as in a two door automobile, the pairs of straps 52, 54 could be tied to the mounting means for the harness seat belt. Also, double sided adhesive tape could be secured along the underneath edges of the hem border 26 of the roof covering portion 12 and then secured either to an exterior portion of the automobile roof 108, or with the doors opened, could be secured to an interior portion of the automobile roof 108 inside the automobile. Accordingly, many other securement arrangements would be obvious to one skilled in the art After the roof covering portion 12 is secured to the automobile roof 108, the front and rear shade portions 14, 16 and the front and rear side shade portions 18, 20, 22, 24 are secured to the roof covering portion 12 by securing the male snap fasteners 64; 66; 88 and 92; and 90 and 94 to their associated female snap fasteners 32; 34; 28; and 30, respectively, so that the automobile roof 108, front and rear windows, and the side windows are protectively covered as shown in Figs. 4 and 5, in such an arrangement that per its the opening and closing of the automobile doors.

Figure 4:
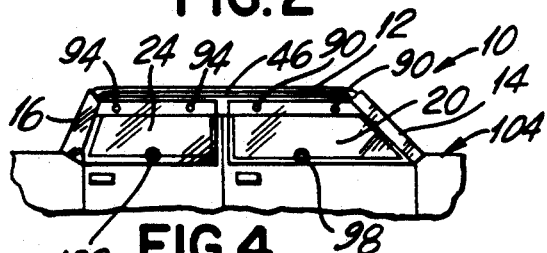
FIG. 4 is a fragmented side elevational view showing the shade portions of FIG. 1 secured to the roof covering portion which is secured to the automobile as shown in FIG. 2.

Fig. 4 shows the front and rear shade portions 14, 16 and the front and rear side shade portions 18, 20, 22, 24 fabricated from a transparent plastic material, which could be clear or tinted in a particular color to screen out some of the sunlight, so that persons seated within the automobile 104 can see outside the automobile 104. Thus, the protective covering device 10 of FIG. 4 can be used when the automobile 104 is being driven.

Figure 5:
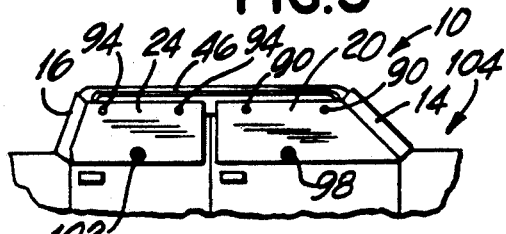
FIG. 5 is a fragmented side elevational view similar to FIG. 4, except the shade portions are modified to be opaque.

FIG. 5 shows the front and rear shade portions 14, 16 and the front and rear side shade portions 18, 20, 22, 24 fabricated from an opaque plastic material. Thus, the protective covering device 10 shown in FIG. 5 would obviously be used when the automobile 104 is not in use, such as during the summer to keep the interior of the automobile 104 cool while protecting same from the sun's hot rays, or during the winter to protect the automobile roof and windows from damage caused by sleet, ice and snow, and to also eliminate the need of scraping ice or snow from theautomobile. Accordingly, the roof covering portion 12 could be opaque to avoid the sun's heat during the summer, or could be a clear transparent to show the color of the automobile 104 therethrough.

Figure 6:
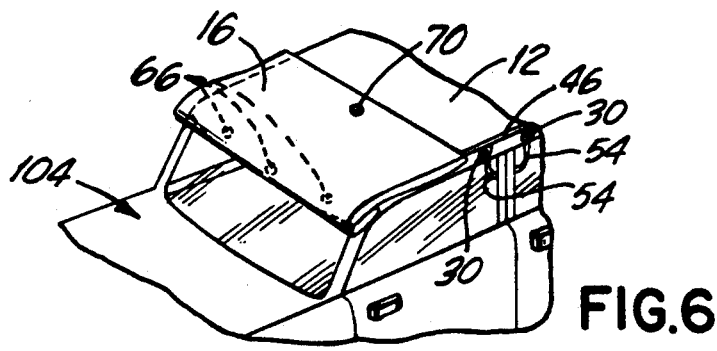
FIG. 6 is a fragmented perspective view showing the rear shade portion folded back onto the roof covering portion when secured on the automobile.

When desired, any one or all of the front and rear shade portions 14, 16 and the front and rear side portions 18, 20, 22, 24 could be folded back onto the roof covering portion 12 and secured thereon by fastening the appropriate female snap portion thereof onto its associated male snap portion on the roof covering portion 12. FIG. 6 shows the rear shade portion 16 folded back onto the roof covering portion 12 and secured thereon by fastening the female snap portion 70 onto its associated male snap portion 42 on the roof covering portion 12.

Obviously, due to the arrangement of the male snap portions 36, 38, 40, 42 on the roof covering portion 12, if it is desired to fold back all of the shade portions 14, 16, 18, 20, 22, 24, first the front and rear side shade portions 18, 20, 22, 24 would be folded back and secured to the roof covering portion 12, and then the front and rear shade portions 14, 16 would be folded back and secured to the roof covering portion 12. Thus, if all the shade portions are opaque, it is possible to drive the automobile 104 with unobstructed vision when the shade portions are folded back and secured to the roof covering portion 12 in the manner mentioned above.

Obviously, if desired, each pair of front and rear side shade portions could be constructed as a single side shade portion for each side of the automobile. This one piece construction would be particularly useful when the protective covering device 10 is used only covering the automobile when not in use, where there is no intention of opening or closing the automobile doors.

It is noted, that the parts of the protective covering device 10 can easily be removed from the automobile 104 and conveniently stored in the automobile 104, such as in the trunk thereof, and can just as quickly and easily be reinstalled onto the automobile 104 to provide a protective cover therefor.

Numerous alterations of the structure herein disclosed will suggest themselves to those skilled in the art. However, it is to be understood that the present disclosure relates to preferred embodiments of the invention which are for purposes of illustration only, and are not to be construed as a limitation of the invention.

What is claimed is:

1. A protective device for an automobile comprising:
    covering means for protecting an automobile roof and windows including a roof covering portion for removable positioning on the automobile roof, a front shade portion for removable positioning on the front window of the automobile, a rear shade portion for removable positioning on the rear window of the automobile, and side shade portions for removable positioning on the opposite side windows of the automobile;
    first fastener means for removably securing said front shade portion to said roof covering portion;
    second fastener means for removably securing said rear shade portion to said roof covering portion;
    third fastener means for removably securing at least one of said side shade portions to one side of said roof covering portion;
    fourth fastener means for removably securing at least another one of said side shade portions to an opposite side of said roof covering portion; and
    additional fastener means for independently securing said front, rear and side shade portions in a folded back position onto said roof covering portion.

2. A protective device according to claim 1, wherein said roof covering portion is fabricated from an opaque plastic material.

3. A protective device according to claim 1, wherein said roof covering portion is fabricated from a transparent plastic material.

4. A protective device according to claim 1, wherein said front, rear and side shade portions are fabricated from an opaque plastic material.

5. A protective device according to claim 1, wherein said front, rear and side shade portions are fabricated from a transparent plastic material.

6. A protective device according to claim 1, wherein said roof covering portion includes securement means for removably securing said roof covering portion to the automobile roof.

7. A protective device according to claim 6, wherein said securement means includes a pair of straps, one of said pair of straps being secured to an edge portion on one side of said roof covering portion, and the other pair of straps being secured to an edge portion on an opposite side of said roof covering portion.

8. A protective device according to claim 1, wherein said first, second, third and fourth fastener means are snap fasteners.

9. A protective device according to claim 1, wherein said additional fastener means are snap fasteners.

10. A protective device according to claim 1, wherein said roof covering portion includes gutter means to prevent water from entering the automobile side windows.

11. A protective device according to claim 10, wherein said gutter means includes longitudinally extending recesses provided along opposite side edge portions of said roof covering portion.

12. A protective device according to claim 1, wherein said first, second, third and fourth fastener means are snap fasteners, said roof covering portion including securement means for removably securing said roof covering portion to the automobile roof, said securement means including a pair of straps, one of said pair of straps being secured to an edge portion on one side of said roof covering portion, and the other pair of straps being secured to an edge portion on an opposite side of said roof covering portion.

13. A protective device according to claim 12, wherein said roof covering portion includes gutter means to prevent water from entering the automobile side windows, said gutter means including longitudinally extending recesses provided along said opposite side edge portions of said roof covering portion.

14. A protective device according to claim 12, wherein said roof covering portion and said front, rear and side shade portions are fabricated from a plastic material.

15. A protective device according to claim 14, wherein said plastic material of at least one of said roof covering portion and said front, rear and side shade portions is opaque.

16. A protective device according to claim 14, wherein said plastic material of at least one of said roof covering portion and said front, rear and side shade portions is transparent.

17. A protective device according to claim 12, wherein said side shade portions include a pair of front and rear side shade portions for each side of the automobile, said third fastener means independently securing one of said pair of front and rear side shade portions to said one side of said roof covering portion, and said fourth fastener means independently securing the other one of said pair of front and rear side shade portions to said opposite side of said roof covering portion.

18. A protective device according to claim 1, wherein said side shade portions include a pair of front and rear side shade portions for each side of the automobile, said third fastener means independently securing one of said pair of front and rear side shade portions to said one side of said roof covering portion, and said fourth fastener means independently securing the other one of said pair of front and rear side shade portions to said opposite side of said roof covering portion.

* * * * *